United States Patent
Jain

(10) Patent No.: US 10,319,009 B2
(45) Date of Patent: Jun. 11, 2019

(54) METHODS, SYSTEMS, AND APPARATUS FOR GROUP-BASED TRANSACTIONS

(71) Applicant: eBay Inc., San Jose, CA (US)

(72) Inventor: Bhupendra Jain, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 1174 days.

(21) Appl. No.: 13/935,109

(22) Filed: Jul. 3, 2013

(65) Prior Publication Data

US 2015/0012373 A1 Jan. 8, 2015

(51) Int. Cl.
*G06Q 30/00* (2012.01)
*G06Q 30/06* (2012.01)

(52) U.S. Cl.
CPC ............... *G06Q 30/0605* (2013.01)

(58) Field of Classification Search
CPC ........................................... G06Q 30/00
See application file for complete search history.

(56) References Cited

U.S. PATENT DOCUMENTS

| | | | | |
|---|---|---|---|---|
| 6,269,343 B1 * | 7/2001 | Pallakoff | | G06Q 30/02 705/26.2 |
| 6,934,690 B1 * | 8/2005 | Van Horn | | G06Q 30/06 705/26.2 |
| 7,680,696 B1 * | 3/2010 | Murray | | G06Q 10/087 705/26.4 |
| 8,504,435 B2 * | 8/2013 | Charles | | G06Q 30/0601 705/14.16 |
| 2002/0065769 A1 * | 5/2002 | Irribarren | | G06Q 40/04 705/37 |
| 2003/0064788 A1 * | 4/2003 | Walker | | G07F 17/32 463/20 |
| 2003/0126040 A1 * | 7/2003 | Mesaros | | G06Q 30/06 705/26.35 |
| 2008/0201256 A1 * | 8/2008 | Chien | | G06Q 40/04 705/37 |
| 2009/0240629 A1 * | 9/2009 | Xie | | G06Q 30/02 705/80 |
| 2010/0318435 A1 * | 12/2010 | Ramanathan | | G06Q 20/12 705/26.35 |
| 2012/0179516 A1 * | 7/2012 | Fakhrai | | G06Q 30/08 705/14.1 |
| 2012/0323697 A1 * | 12/2012 | Marks | | G06Q 30/0601 705/14.66 |
| 2013/0013439 A1 * | 1/2013 | Smullen | | G06Q 30/08 705/26.3 |
| 2013/0018751 A1 * | 1/2013 | Winslade | | G06Q 30/02 705/26.2 |
| 2013/0054324 A1 * | 2/2013 | Charles | | G06Q 30/0601 705/14.16 |

(Continued)

OTHER PUBLICATIONS

Basu, Saikat, "10 sites to compare Google vs Bing results side by side", makeuseof.com, dataed Nov. 11, 2009 (Year: 2009).*

*Primary Examiner* — Mark A Fadok
(74) *Attorney, Agent, or Firm* — Schwegman Lundberg & Woessner, P.A.

(57) ABSTRACT

Methods, systems, and apparatus to generate group transactions for an item are described. An item may be one or more of a product and a service. An acceptable price for an item may be obtained from a consumer. The consumer may be categorized into a group characterized by common price range. A group offer may be provided to one or more sellers and/or one or more buyers.

31 Claims, 12 Drawing Sheets

(56) References Cited

U.S. PATENT DOCUMENTS

2013/0246223 A1\* 9/2013 Mesaros ............ G06Q 30/0627
                                                                    705/26.63
2013/0275253 A1\* 10/2013 Mesaros ............ G06Q 30/0611
                                                                    705/26.4

\* cited by examiner

200

| GROUP IDENTIFIER | ITEM NAME | GROUP STATUS | ITEM PRICE | TERMS |
|---|---|---|---|---|
| 001 | TABLET PC V100 | PROSPECTIVE | $290-350 | FREE DELIVERY |
| 002 | GENEVA WATCH B-35 | TRANSACTED | $1,360-1,400 | 5 YEAR WARRANTY |
| 003 | BRAND X DATA SERVICE | ACCEPTED | $29 | ONE YEAR CONTRACT |
| 004 | BROADWAY PLAY TICKET | OFFERED | $75 | ORCHESTRA SEATING |

| MEMBER IDENTIFIER | MEMBER NAME | ACCEPTABLE PRICE | TERMS | STATUS |
|---|---|---|---|---|
| 003-33-329 | JOHN H SMITH | $219 | FREE DELIVERY | ACCEPTED |
| 034-45-569 | HARRY JONES | $200 | FREE DELIVERY | - - - |
| 101-77-745 | PAMELA SMITH | $185 | - - - | REJECTED |
| 003-56-565 | TOM JORDAN | $195 | 5 YEAR WARRANTY | ACCEPTED |

*FIG. 3*

| | 704 | 708 | 712 | 716 |
|---|---|---|---|---|
| 702 | RULE 1 | GROUP COUNT EXCEEDS 50 | PENDING PRICE - 15% | - - - |
| | RULE 2 | GROUP COUNT EXCEEDS 100 | PENDING PRICE - 25% | - - - |
| | RULE 3 | DISCONTINUED ITEMS | PENDING PRICE - 40% | FREE DELIVERY |
| | RULE 4 | INVENTORY = LOW | PENDING PRICE - 5% | - - - |
| | RULE 5 | INVENTORY = MEDIUM | PENDING PRICE - 10% | - - - |
| | RULE 6 | INVENTORY = HIGH | PENDING PRICE - 20% | - - - |

| ITEM IDENTIFIER | ITEM NAME | GROUP PRICE | GROUP THRESHOLD |
|---|---|---|---|
| 001-3A78 | TABLET PC V100 | $290 | 75 |
| 012-BD54 | GENEVA WATCH B-35 | $1,375 | 10 |
| 230-7F78 | BRAND X DATA SERVICE | $30 | 1,000 |
| 220-A578 | BROADWAY PLAY TICKET | $75 | 50 | ial
METHODS, SYSTEMS, AND APPARATUS FOR GROUP-BASED TRANSACTIONS

TECHNICAL FIELD

The present application relates generally to commerce automation, and more specifically, in one example, to generating a group transaction for a group of buyers and/or sellers.

BACKGROUND

Consumers often shop online for a wide variety of products and services and may request information, such as pricing information, for a product and/or service. Consumers of products and services may generally include individuals, retail consumers, distributors, small business owners, business representatives, corporate representatives, non-profit organizations, and any other consumer of a product and/or service. The providers of the products and services may offer to provide the product and/or service to the consumer. The providers may include individuals, retailers, wholesalers, distributors, manufacturers, service providers, small business owners, independent dealers, and the like. The offers may comprise a price and, optionally, one or more specific terms for the offer. An offer may be to provide a single item (a single product and/or service) or a lot of items. A consumer may evaluate the offers and may accept an offer, reject an offer, or discard an offer.

BRIEF DESCRIPTION OF THE DRAWINGS

Some embodiments are illustrated by way of example and not limitation in the figures of the accompanying drawings in which:

FIG. 2 is an example representation of a group status data element comprising one or more groups of buyers or sellers for a product and/or service, in accordance with an example embodiment;

FIG. 3 is an example representation of a group member data element 300 comprising a group of buyers or sellers for a product and/or service, in accordance with an example embodiment;

DETAILED DESCRIPTION

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, systems, and apparatus for generating a group transaction are described. As used herein, a group transaction is a transaction involving two or more buyers and/or two or more sellers. In one example embodiment, a consumer may indicate an interest in obtaining pricing and/or other information for an item. As used herein, an "item" may refer to a product and/or service. The interest may be indicated by a search for the item, a request for information for the item, a request for pricing information for the item, a selection of an item from a listing, and the like. The interest may be communicated directly to a number of providers of the item as a request for offers, or may be communicated to an intermediary that may communicate the interest to a number of providers. The providers may respond by providing one or more offers for the item to the consumer. If the consumer accepts an offer, the offer may be transacted. If the consumer rejects one or more of the offers and/or does not accept one or more of the offers, the consumer may be queried for a price and/or offer terms that would be acceptable to the consumer. Consumers responding with substantially similar prices and/or offer terms may be categorized into a prospective group for a potential group transaction, as described more fully below. A prospective group may be matched to one or more prospective sellers (or one or more prospective buyers) in an effort to generate a group transaction. In one example embodiment, a group of sellers is matched to a buyer or group of buyers.

Figure 1:
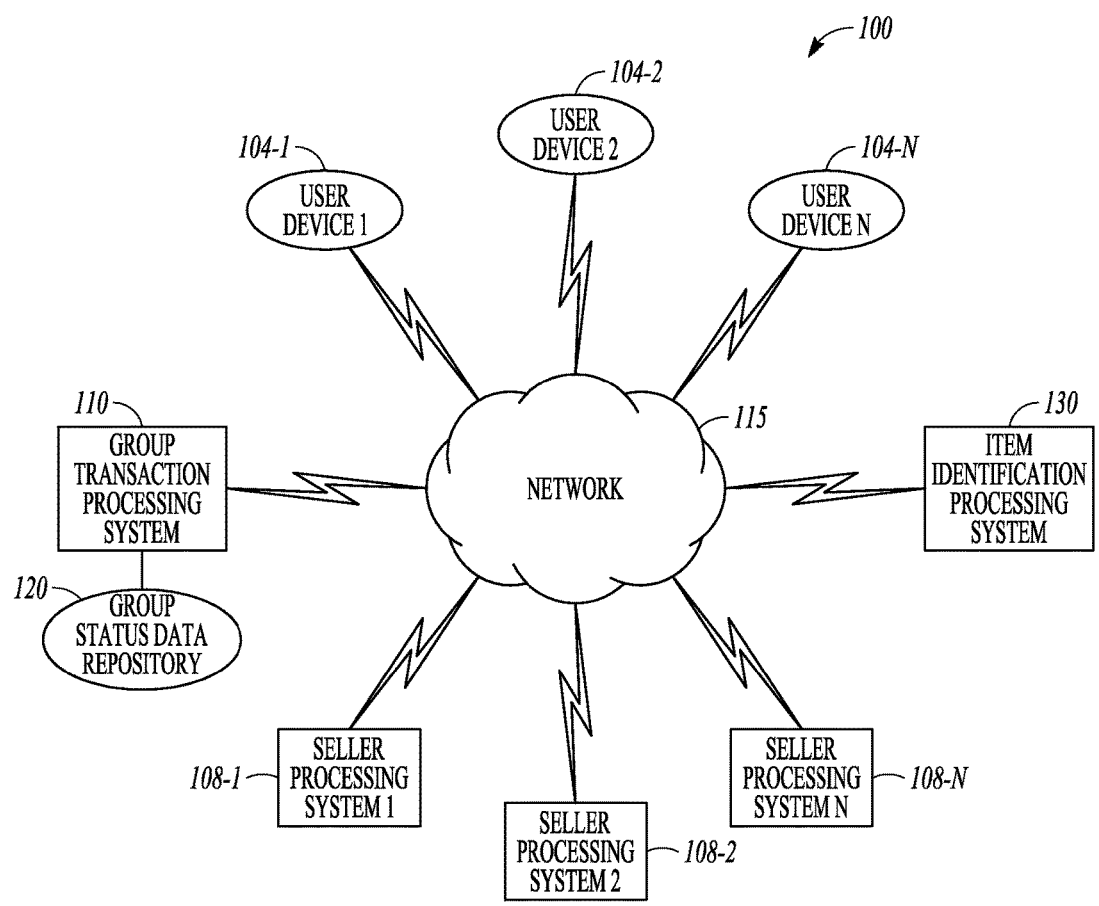
FIG. 1 is a block diagram of an example system, in accordance with an example embodiment, for generating a transaction for a group of buyers and/or sellers.

FIG. 1 is a block diagram of an example system 100, in accordance with an example embodiment, for generating a transaction for a group of buyers and/or sellers. In one example embodiment, the system 100 may comprise one or more user devices 104-1, 104-2 and 104-N (known as user devices 104 hereinafter), one or more seller processing systems 108-1, 108-2 and 108-N (known as seller processing systems 108 hereinafter), a group transaction processing system 110, an optional group status data repository 120, an item identification processing system 130, and a network 115. Each user device (e.g., 104-1) may be a personal computer (PC), a cellular phone, a personal digital assistant (PDA), or any other appropriate computer device. Each user device (104-1, 104-2 or 104-N) may include a consumer transaction processing module 1100, described more fully below in conjunction with FIG. 11. In one embodiment, the consumer transaction processing module 1100 may comprise a web browser program. Although a detailed description is only illustrated for user device 104-1, it is noted that each of the other user devices (e.g., user device 104-2 through user device 104-N) may have corresponding elements with the same functionality.

The seller processing systems 108 and the group transaction processing system 110 may be a server, client, or other processing device that includes an operating system for executing software instructions. Each seller processing system 108 may include a seller transaction processing module 610, described more fully below in conjunction with FIG. 6. The optional group status data repository 120 may comprise a table, array, linked list, index, database, and/or other data structure. The optional group status data repository 120 may store a group status data element 200 and/or a group member data element 300, described more fully below in conjunction with FIGS. 2 and 3, respectively.

The network 115 may be a local area network (LAN), a wireless network, a metropolitan area network (MAN), a wide area network (WAN), a wireless network, a network of interconnected networks, the public switched telephone network (PSTN), and the like.

Each user device 104 may receive a query for item information from a user via an input device such as keyboard, mouse, electronic pen, etc. (not shown in FIG. 1). An item may comprise a product and/or a service and the corresponding information may be in the form of an item listing.

An item identification processing system 130 of an online listing system may store and/or obtain item listings. Each item listing may comprise a detailed description for an item. The item associated with an item listing may be a good or product (e.g., a tablet computer) or service (e.g., a round of golf) that may be transacted (e.g., exchanging, sharing information about, buying, selling, making a bid on, and the like). The item listing may include a title, a category (e.g., electronics, sporting goods, books, antiques, and the like), and other tag information (e.g., color, size, and the like).

Referring back to the user device 104-1, the query received from the user of user device 104-1 may comprise one or more keywords. The user device 104-1 may submit the query to the item identification processing system 130 via the network 115. The item identification processing system 130 may attempt to match the query keywords with the title, the category, the tag information, and/or any other field in the item listing using a search engine.

In response to the submission of the search query, the item identification processing system 130 may attempt to identify one or more item listings that satisfy the query. The item identification processing system 130 may retrieve and may sort the item listings in the search result in a known manner.

The item identification processing system 130 may then return a sorted search result to the user device 104-1 that submitted the query.

The consumer may accept one or more offers in a known manner, or may reject all presented offers due to the price and/or terms of the offer. In one example embodiment, the group transaction processing system 110 may query the consumer for a price and/or offer terms that would be acceptable to the consumer. In one example embodiment, if one or more offers are rejected by the consumer and/or if one or more offers are not accepted by the consumer, the group transaction processing system 110 may query the consumer for a price and/or offer terms that would be acceptable to the consumer. If a response from the consumer is received, the group transaction processing system 110 may categorize the consumer into a prospective group with other consumers who have similar offer criteria (e.g. price and/or offer terms) in the optional group status data repository 120. The group transaction processing system 110 may continuously categorize consumers into prospective groups in the optional group status data repository 120. As used herein, similar offer criteria may be related by a similar price or price range, similar offer terms, and the like.

The group transaction processing system 110 may continue forming a particular group and proposing offers until the group formation period ends for a corresponding group. The group formation period may end: 1) at a predefined time; 2) when no new members have been added to the group for a predefined time period; 3) when a group transaction has been offered; 4) when a group transaction has been executed; or 5) when a count of group members equals or exceeds a group threshold; and the like.

In one example embodiment, the group transaction processing system 110 may submit a proposal comprising offer criteria for a prospective group to one or more of the seller processing systems 108. The submission of the proposal may be triggered by: 1) a request for a group transaction proposal submitted by one or more of the seller processing systems 108; 2) an offer for a group transaction submitted by one or more of the seller processing systems 108; 3) a size of a prospective group; 4) an end of a group formation period; and the like.

Each seller processing system 108 that receives a proposal from the group transaction processing system 110 may evaluate the offer criteria to determine if the offer proposal is acceptable. If the offer proposal is unacceptable, the seller processing system 108 may inform the group transaction processing system 110 that the offer is rejected. If the offer is acceptable, the seller processing system 108 may inform the group transaction processing system 110 that the offer is accepted. In one example embodiment, a group threshold indicating a minimum count of members in a group may be exchanged between the seller processing system 108 and the group transaction processing system 110.

In response to receiving an indication from a seller processing system 108 that an offer is accepted, the group transaction processing system 110 may inform one or more members of the prospective group of the status of the corresponding offer.

In one example embodiment, each member of the prospective group may accept or reject the offer and may inform the group transaction processing system 110 of the acceptance or rejection of the offer. The group transaction processing system 110 may record the status (e.g., acceptance or rejection) of one or more group members in, for example, group member data element 300 (as described more fully below).

In one example embodiment, if the group transaction processing system 110 receives a number of offer acceptances from prospective group members that equals or exceeds a group threshold, the group transaction processing system 110 will inform the corresponding seller processing system 108 of the acceptance of the offer. If the group transaction processing system 110 receives a number of offer acceptances from prospective group members that fails to equal or exceed the group threshold, the group transaction processing system 110 will inform the corresponding seller processing system 108 of the rejection of the offer. In one example embodiment, the seller processing system 108 may submit a revised offer with a smaller group threshold.

In one example embodiment, the group transaction processing system 110 may provide a count of the number of accepting members in the prospective group to the seller processing system 108. In one example embodiment, the group transaction processing system 110 may inform the corresponding seller processing system 108 of the identity of the prospective group and/or the identity of one or more members of the prospective group. In one example embodiment, the group transaction processing system 110 may inform the members of the prospective group that the group offer has been accepted.

The group transaction may then be executed. In one example embodiment, the group transaction may be executed directly between each buyer and seller. In one example embodiment, the group transaction is executed via a group transaction intermediary or service.

FIG. 2 is an example representation of a group status data element 200 comprising one or more groups of buyers for a product and/or service, in accordance with an example embodiment. Each row 202 of the group status data element 200 may correspond to a group of buyers. Column 204 may comprise a group identifier, column 208 may comprise a name of an item associated with the group, column 212 may comprise a group status, column 216 may comprise an offer price or offer price range, and column 220 may comprise one or more offer terms. Examples of group status may include one or more of: 1) prospective; 2) offered; 3) accepted; and 6) transacted. A prospective group is a group being established or formed. An offered group is a group having a corresponding offer that has been presented to one or more sellers. An accepted group is a group with at least two members who have reached a group transaction agreement with one or more sellers. A transacted group is a group with at least one member who has executed a transaction with one or more sellers. In one example embodiment, a group status data element 200 may be maintained for a group of sellers.

FIG. 3 is an example representation of a group member data element 300 comprising a group of buyers for a product and/or service, in accordance with an example embodiment. Each row 302 of the group member data element 300 may correspond to a member of the group. Column 304 may comprise a group member identifier, column 308 may comprise a group member name, column 312 may comprise an acceptable price or price range, column 316 may comprise one or more offer terms; and column 320 may comprise an offer status. Examples of offer status may include one or more of: 1) accepted; 2) rejected; and 3) expired. In one example embodiment, a group member data element 300 may be maintained for a group of sellers.

Figure 4:
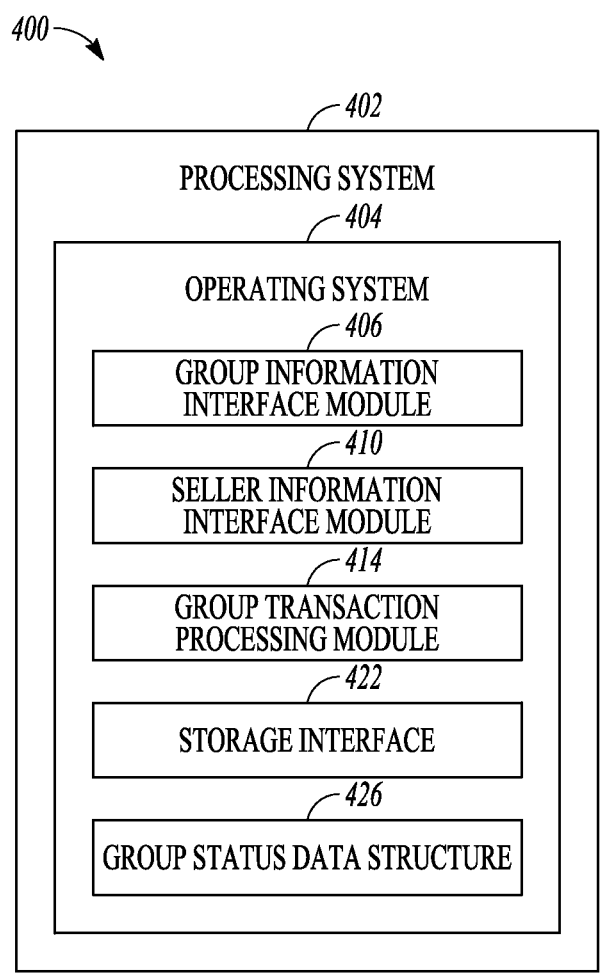
FIG. 4 is a block diagram of an example apparatus, in accordance with an example embodiment, for generating a group transaction.

FIG. 4 is a block diagram of an example apparatus 400, in accordance with an example embodiment, for generating a transaction for a group of buyers and/or sellers. The apparatus 400 is shown to include a processing system 402 that may be implemented on a client or other processing device that includes an operating system 404 for executing software instructions.

In accordance with an example embodiment, the apparatus 400 may include a group information interface module 406, a seller information interface module 410, and a group transaction processing module 414. In accordance with an example embodiment, the apparatus 400 may further include a storage interface 422 and a group status data structure 426.

The group information interface module 406 may receive information regarding items of interest to a user. The information regarding items of interest to a user may be obtained, for example, from the item identification processing system 130 and/or from the user device 104. The group information interface module 406 may solicit information from a user regarding an acceptable price and/or offer terms for an item, may inform the user of a group offer that substantially meets the user's criteria for an acceptable offer, and may receive an acceptance or rejection of a group offer from a user.

The seller information interface module 410 may obtain a group offer from a seller, may present a group offer to a seller, may receive an acceptance or rejection of an offer from a seller, and may present an acceptance or rejection of an offer to a seller. The group transaction processing module 414 may obtain information from a user regarding an acceptable price and/or offer terms for an item and may compile a group of buyers with substantially similar offer criteria. The group transaction processing module 414 may submit a proposal comprising offer criteria for a prospective group to one or more of the seller processing systems 108 via the seller information interface module 410, may inform each member of the prospective group of an offer from one or more of the seller processing systems 108, may record the offer status (e.g., accepted, rejected or expired) of each group member, and may inform the corresponding seller processing system 108 of the rejection or acceptance of the offer.

In one example embodiment, the group transaction processing module 414 may inform the corresponding seller processing system 108 via the seller information interface module 410 of a count of the number of offer-accepting members in the prospective group. In one example embodiment, the group transaction processing module 414 may inform the corresponding seller processing system 108 via the seller information interface module 410 of the identity of the prospective group and/or the identity of one or more members of the prospective group.

Figure 5A:
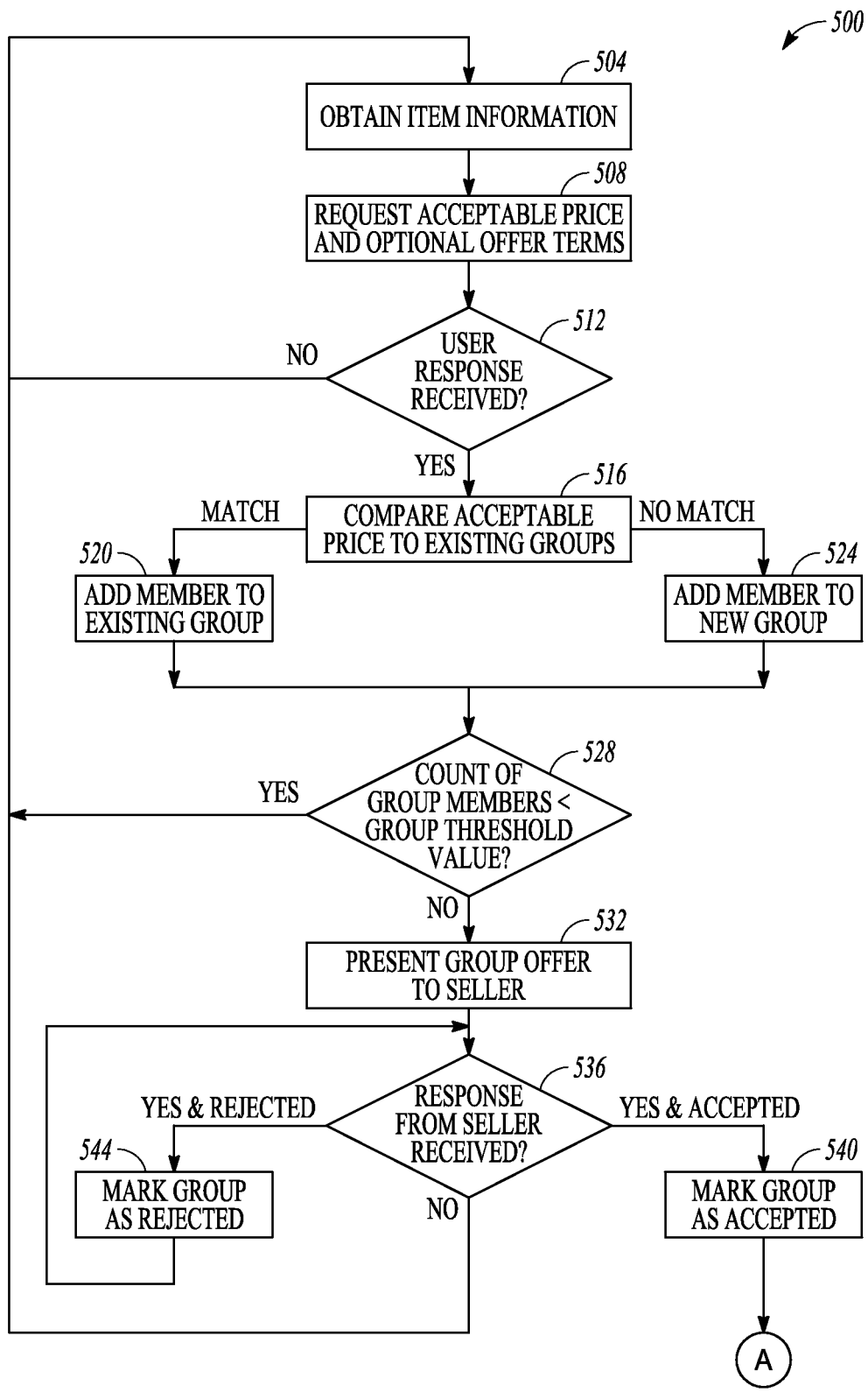
FIGS. 5A and 5B are an example flowchart for a group transaction method, in accordance with an example embodiment.
Figure 5B:
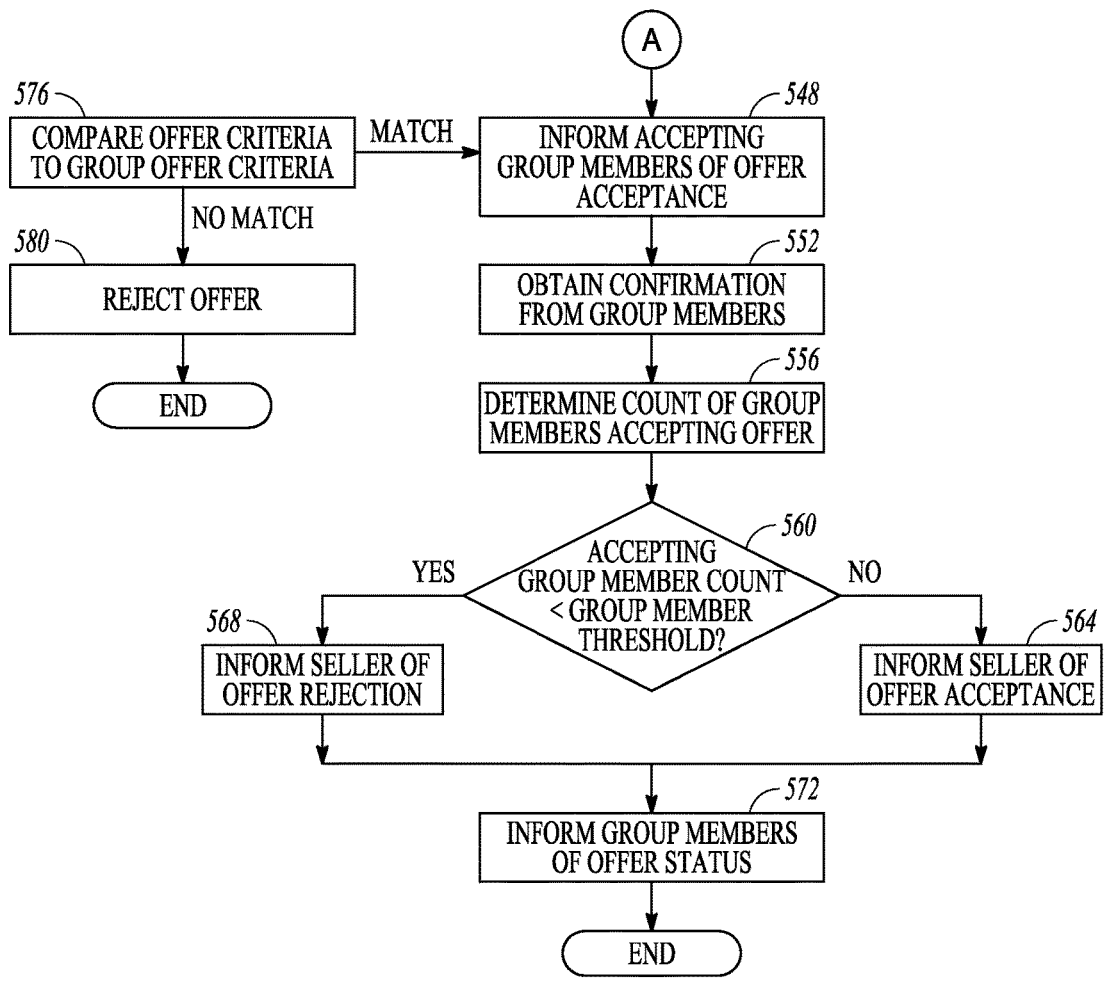

FIGS. 5A and 5B are an example flowchart for a group transaction method 500, in accordance with an example embodiment. In one example embodiment, one or more of the operations of the group transaction method 500 may be performed by the group transaction processing system 110. In one example embodiment, information regarding an item of interest to a user and/or regarding an unaccepted offer to purchase an item may be received (operation 504). A user may be requested to provide an acceptable price and optional offer terms for purchasing the item of interest (operation 508). During operation 508, a user may optionally be requested to provide an automatic payment method. For example, a user may provide credit card information and/or an electronic demand via, for example, the PayPal service of San Jose, Calif., U.S.A. A test may be performed to determine if a user response is received (operation 512). If no response is received within a predefined period of time, the method may proceed to operation 504. If a response is received within the predefined period of time and the response does not include an acceptable price, the method may proceed to operation 504. If a response is received within the predefined period of time and the response includes an acceptable price, a test is performed to determine if the acceptable price falls within a price range of an existing group for the item (operation 516). If the acceptable price falls within a price range of an existing group for the item, the member is added to the existing group (operation 520). If the acceptable price does not fall within a price range of an existing group for the item, a new group is created and the member is added to the new group (operation 524). A test is then performed to determine if the number of members in the group is less than a group threshold value associated with the group offer (operation 528). The group threshold may correspond to a single group, or may correspond to a plurality of groups. If the number of members in the group is less than the group threshold value, the method proceeds to operation 504. If the number of members in the group equals or exceeds the group threshold value, the price and optional offer terms may be presented to one or more sellers (operation 532). During operation 532, historical group pricing information, such as a historical group price trend, may optionally be presented to one or more sellers. For example, the price and optional offer terms for the last executed group transaction for a same or similar item may optionally be presented to one or more sellers.

A test may be performed to determine if a response from one or more sellers has been received (operation 536). If no response is received within a predefined period of time, the method may proceed to operation 504. If a response is received within the predefined period of time and the response includes an acceptance of the offer, the group is marked as accepted in the group status data element 200 (operation 540) and the method proceeds to operation 548. If a response is received within the predefined period of time and the response includes a rejection of the offer, the group is marked as rejected in the group status data element 200 (operation 544) and the method proceeds to operation 536 to wait for a response from another seller. The seller and/or one or more members of the group may be informed of the status of the group offer (operation 548).

In one example embodiment, after one or more members of the group are informed of the status of the group offer (operation 548), one or more of the group members may be given the opportunity to confirm or withdraw their intention to purchase the item (operation 552). The group transaction processing system 110 may determine a count of group members who have confirmed their intention to purchase the item and/or may determine a count of group members who have not withdrawn their intention to purchase the item (operation 556). A test may then be performed to determine if the count of offer-accepting group members equals or exceeds a group threshold value (operation 560). If the determined count is equal to or greater than a group threshold value, the group transaction processing system 110 may inform the seller of the acceptance of the offer (operation 564). If the determined count is less than a threshold value, the group transaction processing system 110 may inform the seller of the rejection of the offer (operation 568). The group transaction processing system 110 may inform the group members of the status of the offer (operation 572).

In one example embodiment, if the determined count is less than the group threshold value, the group transaction processing system 110 may inform the seller of the group member count and may request that the seller indicate whether the offer is acceptable with the revised group member count.

In one example embodiment, a seller may submit a group offer proposal for a particular item from the group transaction processing system 110. In response to receiving the request for the offer, the group transaction processing system 110 may perform the method 500 starting at operation 576. The group transaction processing system 110 may compare the criteria of the group offer proposal to each of one or more existing groups (operation 576). If a match is not found, the group transaction processing system 110 may inform the seller that the offer is rejected (operation 580). If a match is found, the group transaction processing system 110 may proceed to operation 548 and may proceed as described above.

Figure 6:
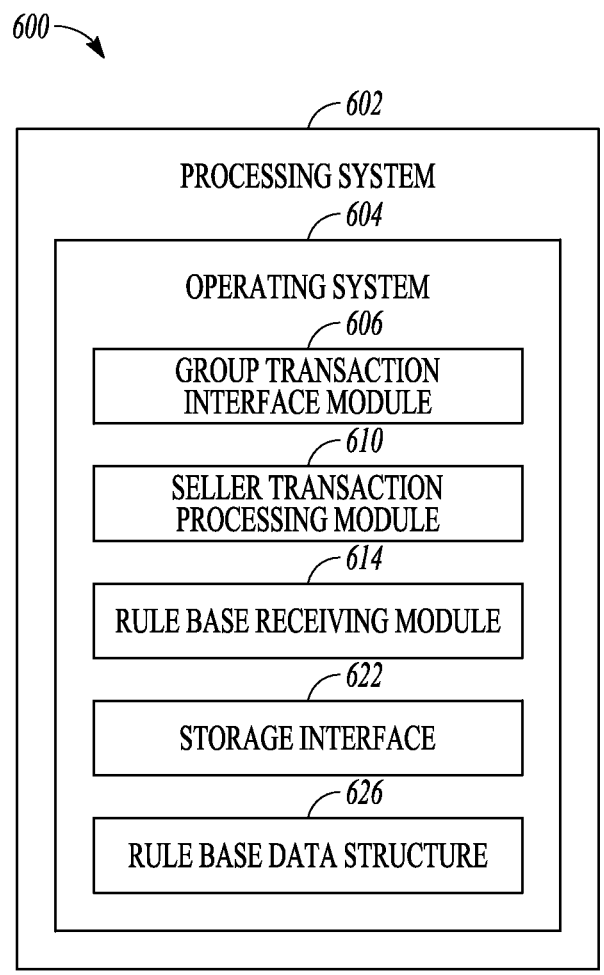
FIG. 6 is a block diagram of an example apparatus, in accordance with an example embodiment, for providing electronic commerce to a seller.

FIG. 6 is a block diagram of an example apparatus, in accordance with an example embodiment, for providing electronic commerce to a seller. The apparatus 600 is shown to include a processing system 602 that may be implemented on a client or other processing device that includes an operating system 604 for executing software instructions. In accordance with an example embodiment, the apparatus 600 may include a group transaction interface module 606, a seller transaction processing module 610, and a rule base receiving module 614. In accordance with an example embodiment, the apparatus 600 may further include a storage interface 622 and a rule base data structure 626. The rule base data structure 626 may comprise one or more rules that may be statically or dynamically used to determine an acceptable offer for selling a product and/or service, as described more fully below in conjunction with FIG. 7.

The group transaction interface module 606 may receive an offer from the group transaction processing system 110, and may present an acceptance or rejection of the offer to the group transaction processing system 110. The group transaction interface module 606 may request an offer from the group transaction processing system 110 and may present an offer to the group transaction processing system 110. The seller transaction processing module 610 may evaluate an offer from the group transaction processing system 110, and may determine whether to accept or reject the offer. The rule base receiving module 614 may enable a seller to load a rule base for determining whether to accept or reject an offer.

Figures 7, 8:
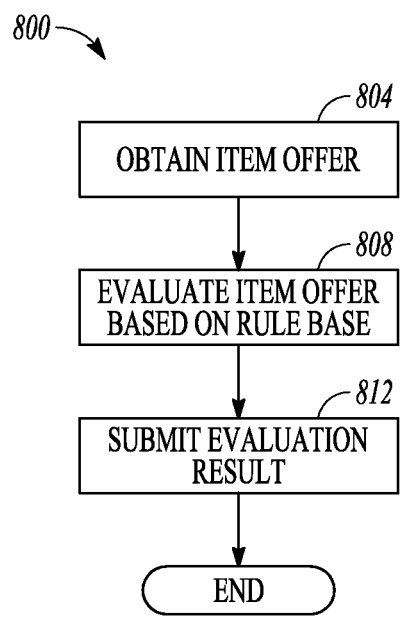
FIG. 7 is an example representation of a rule base comprising one or more rules that may be statically or dynamically used to determine an acceptable offer for a product and/or service, in accordance with an example embodiment.
FIG. 8 is an example flowchart for an electronic commerce method for a seller, in accordance with an example embodiment.

FIG. 7 is an example representation of a rule base 700 comprising one or more rules that may be statically or dynamically used to determine an acceptable offer for selling a product and/or service, in accordance with an example embodiment. Each row 702 of the rule base 700 may correspond to one rule. Column 704 may comprise a rule identifier, column 708 may comprise the condition for applying the corresponding rule, column 712 may comprise a bid price or formula for calculating the price for the product and/or service, and column 716 may comprise one or more optional terms for the offer. Example conditions may include one or more of: 1) a size of a group; 2) a status of an item; 3) an inventory level of an item; 4) a backlog level of a service; and the like. An example status of an item may be: 1) discontinued; 2) surplus; and the like. Example formulas may include: 1) a fixed price; 2) a percentage discount on a pending price; and the like.

FIG. 8 is an example flowchart for an electronic commerce method 800 for a seller, in accordance with an example embodiment. In one example embodiment, one or more of the operations of the electronic commerce method 800 may be performed by the seller processing system 108. An offer may be received, for example, from the group transaction processing system 110 (operation 804). The offer may be evaluated according to the rule base 700 (operation 808). The result of the evaluation (for example, an acceptance or rejection of the offer) may be submitted to the group transaction processing system 110 (operation 812).

Figures 9, 10:
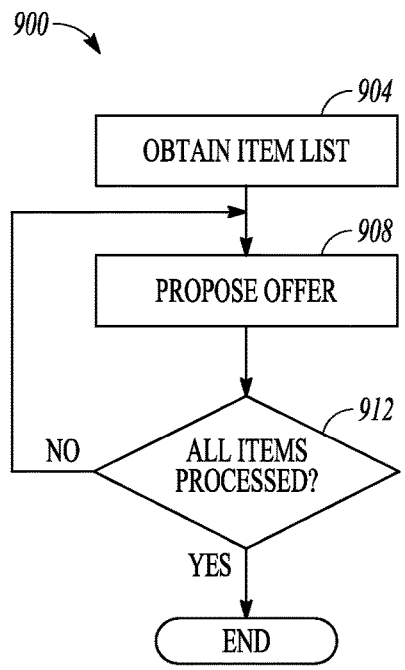
FIG. 9 is an example flowchart for an electronic commerce method for a seller, in accordance with an example embodiment.
FIG. 10 is an example representation of a candidate item list, in accordance with an example embodiment.

FIG. 9 is an example flowchart for an electronic commerce method 900 for a seller, in accordance with an example embodiment. In one example embodiment, one or more of the operations of the electronic commerce method 900 may be performed by the seller processing system 108. A list of items may be obtained that have been identified by a seller as being candidates for a group offer (operation 904). For example, each item may comprise an item identifier, an item name, a group price, and a group threshold, as described more fully below in conjunction with FIG. 10. For each item, an offer may be proposed to the group transaction processing system 110 (operation 908). A test may be performed to determine if all items in the list have been processed (operation 912). If all items have not been processed, the method may proceed to operation 908. If all items have been processed, the method may end.

FIG. 10 is an example representation of a candidate item list 1000 of items that may be proposed for group offers, in accordance with an example embodiment. Each row 1002 of group offer list 1000 may correspond to an item that is a candidate for a group offer. Column 1004 may comprise an item identifier, column 1008 may comprise an item name, column 1012 may comprise a group price for the corresponding offer, and column 1016 may comprise a group threshold value for the corresponding offer.

Figure 11:
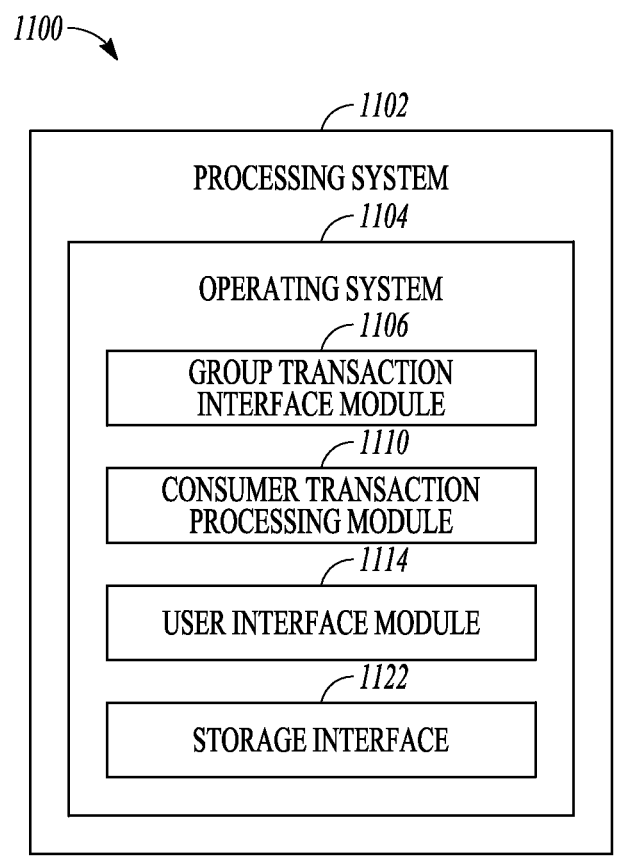
FIG. 11 is a block diagram of an example apparatus, in accordance with an example embodiment, for providing electronic commerce to a consumer.

FIG. 11 is a block diagram of an example apparatus 1100, in accordance with an example embodiment, for providing electronic commerce to a consumer. The apparatus 1100 is shown to include a processing system 1102 that may be implemented on a client or other processing device that includes an operating system 1104 for executing software instructions. In accordance with an example embodiment, the apparatus 1100 may include a group transaction interface module 1106, a consumer transaction processing module 1110, and a user interface module 1114. In accordance with an example embodiment, the apparatus 1100 may further include a storage interface 1122.

The user interface module 1114 may allow a user to enter keywords for an item search, may present an initial price for an item to a prospective buyer of an item, may obtain an acceptance or rejection of the initial offer price from the buyer, and may request an acceptable price and optional offer terms for the item from the buyer. The user interface module 1114 may present a group offer price to the buyer, and may obtain from the buyer an acceptance or rejection of the group offer. The user interface module 1114 may inform the buyer of the acceptance of the group offer by a seller.

The group transaction interface module 1106 may obtain a request for information regarding an item and may obtain an acceptable price and optional offer terms for an item, and may inform the group transaction processing system 110 of an acceptance or rejection of the group offer price.

The consumer transaction processing module 1110 may coordinate the communication between the consumer via the user interface module 1114 and the group transaction processing system 110 via the group transaction interface module 1106.

Figure 12:
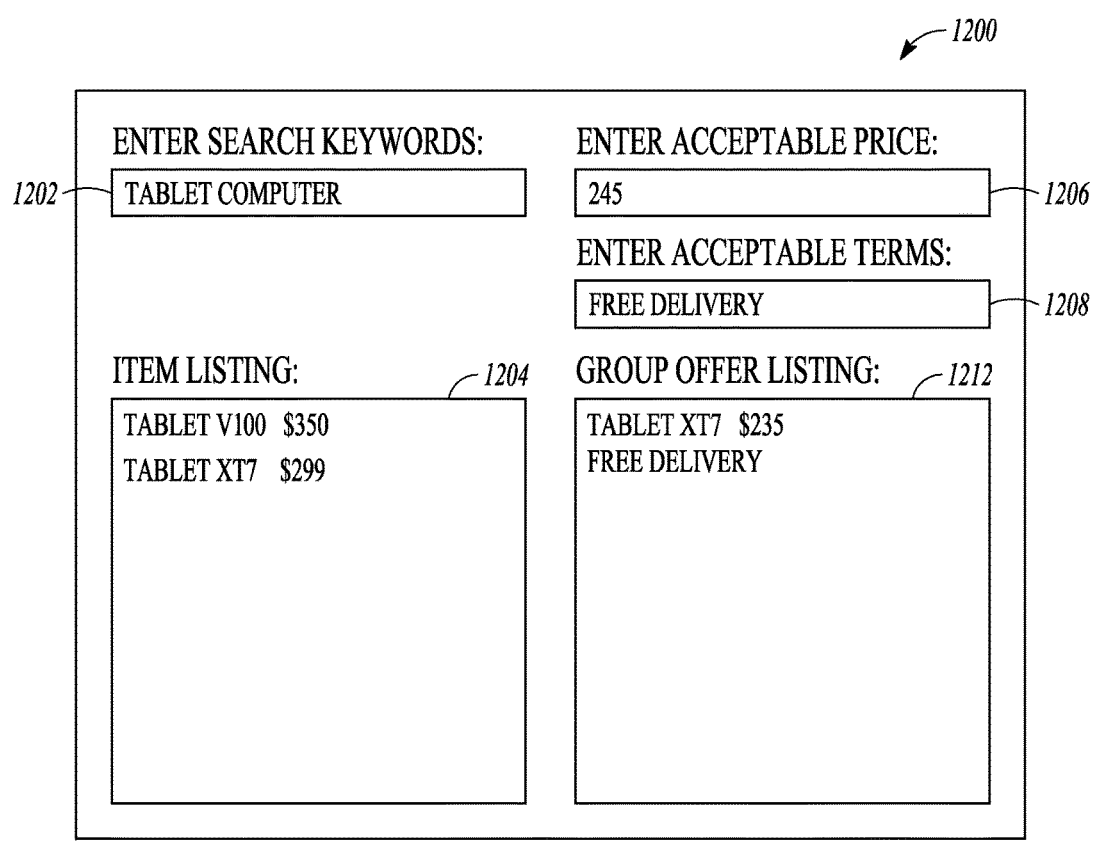
FIG. 12 is an example representation of a user interface for performing a consumer transaction for a product and/or service, in accordance with an example embodiment.

FIG. 12 is an example representation of a user interface for performing a consumer transaction for a product and/or service, in accordance with an example embodiment. A mobile device may provide the user interface 1200, for example. In one example embodiment, a user may search for a product and/or service by entering one or more keywords via the input field 1202. The product and/or service and a corresponding price may be presented in an item listing field 1204. The consumer may accept a purchase of the item by double-clicking on the item in the item listing field 1204. If one or more offers are rejected and/or one or more offers are not accepted by the consumer, the consumer may be requested to provide a price and/or offer terms that would be acceptable to the consumer via input field 1206 and input field 1208. A group offer may be presented in a group item listing field 1212.

Figure 13:
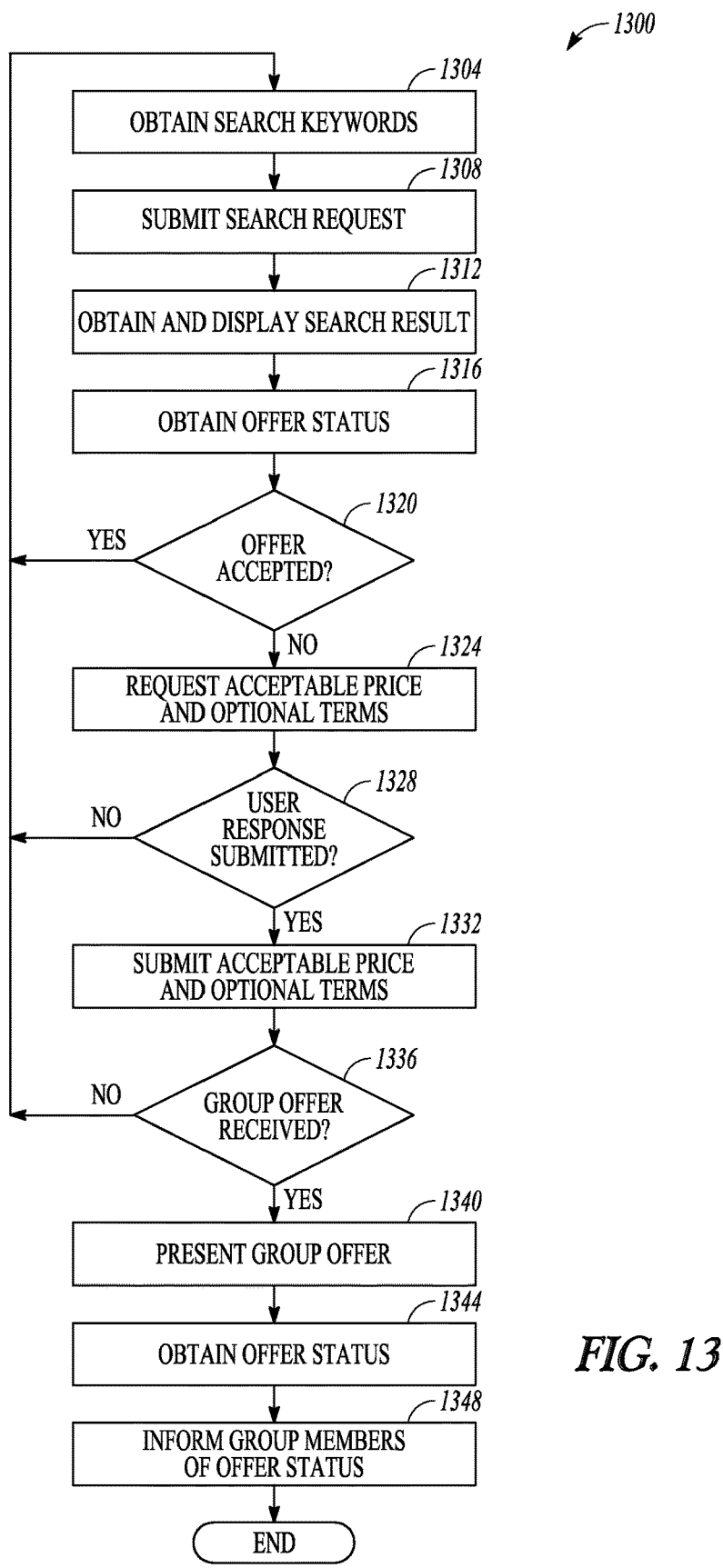
FIG. 13 is an example flowchart for a consumer electronic commerce method for performing a consumer transaction for a product and/or service, in accordance with an example embodiment.

FIG. 13 is an example flowchart 1300 for a consumer electronic commerce method 1300 for performing a consumer transaction for a product and/or service, in accordance with an example embodiment. In one example embodiment, one or more of the operations of the consumer electronic commerce method 1300 may be performed by the user device 104-1.

A user may search for a product and/or service by entering one or more keywords via the input field 1202. The keywords may be obtained from the user (operation 1304) and may be submitted to the item identification processing system 130 (operation 1308). The search result comprising the item and a corresponding offer price may be presented in the item listing field 1204 (operation 1312). The buyer decision (offer status, e.g., an acceptance or rejection of the purchase of the item) may be obtained (operation 1316). A test may be performed to determine if one or more offers are not accepted (operation 1320).

If all offers are accepted, the method may proceed to operation 1304. If one or more offers are not accepted, the consumer may be requested to provide a price and optional offer terms that would be acceptable to the consumer via input field 1206 and input field 1208 (operation 1324). A test may be performed to determine if a user response was submitted (operation 1328). If no user response is submitted within a predefined period of time, the method may proceed to operation 1304. If a user response was submitted within a predefined period of time, the user response may be submitted, for example, to the group transaction processing system 110 (operation 1332).

A test may be performed to determine if a group offer was received from a seller processing system 108 and/or group transaction processing system 110 (operation 1336). If no group offer is received within a predefined period of time, the method may proceed to operation 1304. If a group offer is received within a predefined period of time, the group offer may be presented in the group item listing field 1212 (operation 1340).

In one example embodiment, the consumer may be given the opportunity to accept or reject the purchase of an item after the group offer is presented. The acceptance or rejection of the purchase of the item may be obtained from the consumer and submitted to the group transaction processing system 110 (optional operation 1344). A confirmation of the acceptance or rejection of the offer by the seller may be received and presented to the consumer (optional operation 1348).

Although certain examples are shown and described here, other variations exist and are within the scope of the invention. It will be appreciated by those of ordinary skill in the art that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 115 (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
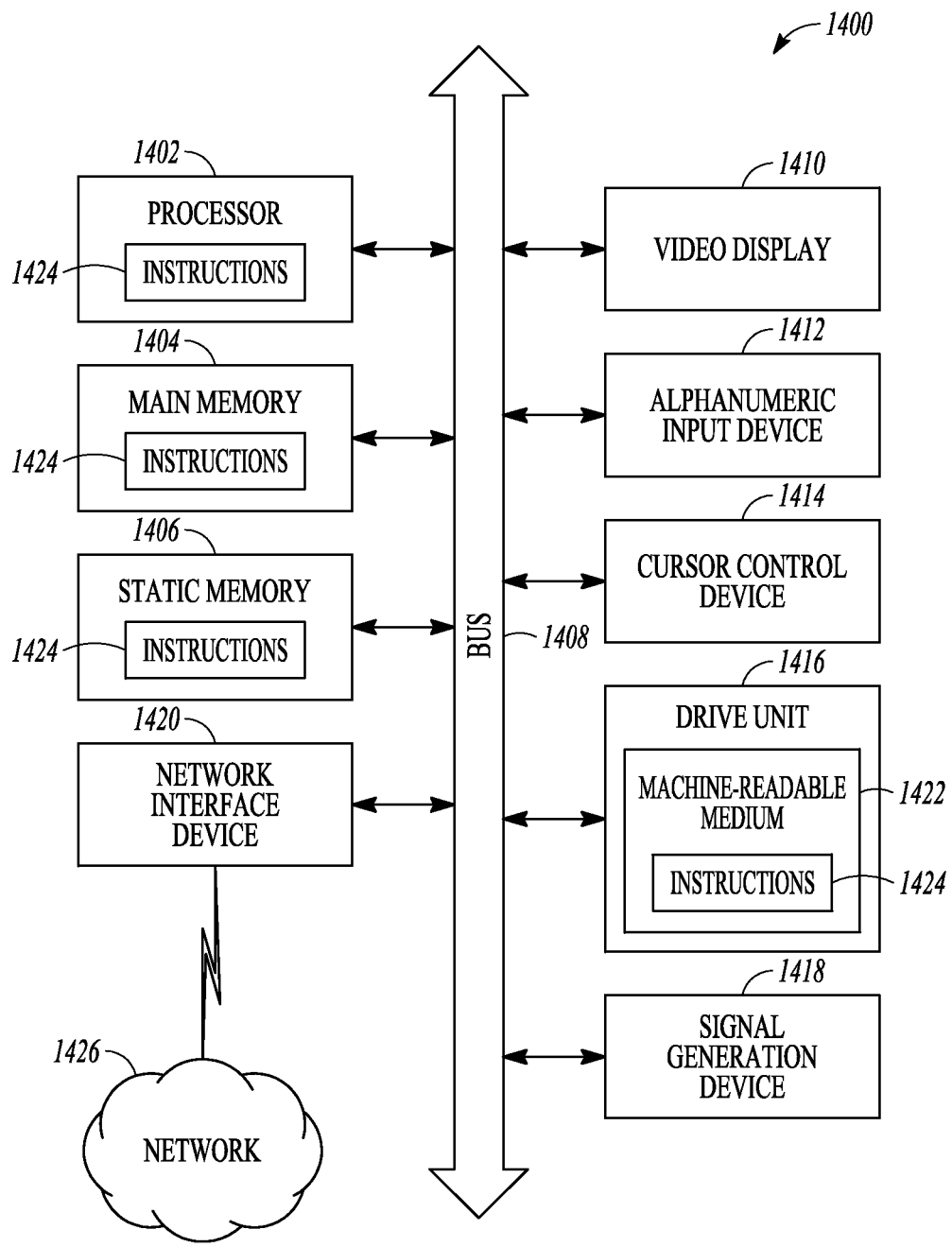
FIG. 14 is a block diagram of machine within which instructions may be executed for causing the machine to perform any one or more of the methodologies discussed herein.

FIG. 14 is a block diagram of a machine within which instructions may be executed for causing the machine to perform any one or more of the methodologies discussed herein. In one example embodiment, the machine may be the user device 104. In one example embodiment, the machine may be the seller processing system 108 and/or group transaction processing system 110. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation device 1414 (e.g., a mouse), a disk drive unit 1416, a signal generation device 1418 (e.g., a speaker) and a network interface device 1420.

Machine-Readable Medium

The drive unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media. Instructions 1424 may also reside within the static memory 1406.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions 1424 for execution by the machine and that cause the machine to perform any one or more of the methodologies of the present invention, or that is capable of storing, encoding or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1424 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for generating a group transaction, the apparatus comprising:
   a processor; and
   memory to store instructions that, when executed by the processor, cause the processor to perform operations comprising:
   forming a graphical user interface configured to obtain a search query for an item from a plurality of users, the search query comprising an item search term and one or more search attribute, the graphical user interface comprising a first search result element adjacent to a second search result element;
   categorizing two or more users in a group characterized by a common item of the item search term and a common range of the one or more search attribute corresponding to the common item;
   determining that a count of group members exceeds a group count threshold value for the common item, the group count threshold value predefined by a client device of a user providing the common item;
   in response to receiving the search query and determining that the count of group members exceeds the group count threshold value, concurrently presenting the first search result element and the second search result element in the graphical user interface,
   the first search result element identifying the group, the common item, and the common range,
   the second search result element identifying a listing of the common item provided by another user.

2. The apparatus of claim 1, wherein a completion of the categorization is based on one or more of 1) a predefined time; 2) an absence of adding a new group member for a predefined period of time; 3) a submission of a group offer; 4) an execution of a group transaction; and 5) a comparison of a count of group members and a group threshold value.

3. The apparatus of claim 1, further comprising instructions that, when executed by the processor, cause the processor to:
   obtain confirmation of an intent to purchase the item from each of one or more group members; and
   inform one or more sellers of a first status of the group offer.

4. The apparatus of claim 3, further comprising instructions that, when executed by the processor, cause the processor to:
   obtain confirmation of an intent to sell the item from each of one or more of the sellers; and
   inform one or more group members of a second status of the group offer.

5. The apparatus of claim 4, wherein the informing operation is performed based on a comparison of a count of group members and a group threshold value.

6. The apparatus of claim 4, further comprising instructions that, when executed by the processor, cause the processor to:
   obtain a revised group offer from a seller based on a revised group threshold value.

7. The apparatus of claim 1, wherein the group offer is provided based on one or more of 1) a completion of forming a group; 2) a predefined time; 3) an absence of adding a new group member for a predefined period of time; 4) a size of the group; 5) a request for a group offer from a seller; and 6) a proposal for a group offer from a seller.

8. The apparatus of claim 1, further comprising instructions that, when executed by the processor, cause the processor to:
   exchange a group threshold value with a seller.

9. The apparatus of claim 1, further comprising instructions that, when executed by the processor, cause the processor to:
   provide to a seller one or more of: 1) a count of group members; 2) an identity of a group; and 3) an identity of one or more group members.

10. The apparatus of claim 1, further comprising instructions that, when executed by the processor, cause the processor to:
    obtain a group offer proposal from a seller; and
    compare the group offer proposal to offer criteria of one or more groups.

11. The apparatus of claim 10, further comprising instructions that, when executed by the processor, cause the processor to:
    inform the seller of an acceptance or rejection of the proposed group over based on the comparison.

12. An apparatus for generating a group transaction with a seller, the apparatus comprising:
    a processor;
    memory to store instructions that; when executed by the processor, cause the processor to:
    obtain a group offer to purchase an item;
    evaluate the group offer based on one or more rules; and
    provide one of an acceptance and a rejection of the group over.

13. The apparatus of claim 12, wherein each rule comprises a condition based on one or more of: 1) a size of a group; 2) a status of the item; 3) an inventory level of the item; and 4) a backlog level of a service.

14. The apparatus of claim 12, wherein the group offer is obtained from a group processing intermediary.

15. An apparatus for generating a group transaction with a seller, the apparatus comprising:
    a processor;
    memory to store instructions that, when executed by the processor, cause the processor to:
    generate a group offer proposal for an item based on one or more rules; and
    provide the group offer to a group processing intermediary.

16. The apparatus of claim 15, wherein each rule comprises a condition based on one or more of: 1) a size of a group; 2) a status of the item; inventory level of the item; and 4) a backlog level of a service.

17. A method for generating a group transaction, the method comprising:
    forming a graphical user interface configured to obtain a search query for an item from a plurality of users, the search query comprising an item search term and one or more search attribute, the graphical user interface comprising a first search result element adjacent to a second search result element;

categorizing two or more users in a group characterized by a common item of the item search term and a common range of the one or more search attribute corresponding to the common item;

determining that a count of group members exceeds a group count threshold value for the common item, the group count threshold value predefined by a client device of a user providing the common item;

in response to receiving the search query and determining that the count of group members exceeds the group count threshold value, concurrently presenting the first search result element and the second search result element in the graphical user interface, the first search result element identifying the group, the common item, and the common range, the second search result element identifying a listing of the common item provided by another user.

18. The method of claim 17, wherein a completion of the categorization is based on one or more of: 1) a predefined time; 2) an absence of adding a new group member for a predefined period of time; 3) a submission of a group offer; 4) an execution of a group transaction; and 5) a comparison of a count of group members and a group threshold value.

19. The method of claim 17, further comprising maintaining a record of a group offer status for one or more group members.

20. The method of claim 17, further comprising:
obtaining confirmation of an intent to purchase the item from each of one or more group members; and
informing one or more sellers of a first status of the group offer.

21. The method of claim 17, wherein the group offer is provided based on one or more of: 1) a completion of forming a group; 2) a predefined time; 3) an absence of adding a new group member for a predefined period of time; 4) a size of the group; 5) a request for a group offer from a seller; and 6) a proposal for a group offer from a seller.

22. The method of claim 17, further comprising exchanging a group threshold value with a seller.

23. The method of claim 17, further comprising providing to a seller one or more of: 1) a count of group members; 2) an identity of a group; and 3) an identity of one or more group members.

24. The method of claim 17, further comprising:
obtaining a group offer proposal from a seller; and
comparing the group offer proposal to offer criteria of one or more groups.

25. The method of claim 24, further comprising informing the seller of an acceptance or rejection of the proposed group offer based on the comparison.

26. A method for generating a group transaction with a seller, the method comprising:
obtaining a group offer to purchase an item;
evaluating the group offer based on one or more rules; and
providing one of an acceptance and a rejection of the group offer.

27. The method of claim 26, wherein each rule comprises a condition based on one or more of 1) a size of a group; 2) a status of the item; 3) an inventory level of the item; and 4) a backlog level of a service.

28. The method of claim 26, wherein the group offer is obtained from a group processing intermediary.

29. A method for generating a group transaction with a seller, the method comprising:
generating a group offer proposal for an item based on one or more rules; and
providing the group offer to a group processing intermediary.

30. A non-transitory computer-readable medium embodying instructions that, when executed by a processor of a machine, cause the machine to perform operations comprising:
forming a graphical user interface configured to obtain a search query for an item from a plurality of users, the search query comprising an item search term and one or more search attribute, the graphical user interface comprising a first search result element adjacent to a second search result element;
categorizing two or more users in a group characterized by a common item of the item search term and a common range of the one or more search attribute corresponding to the common item;
determining that a count of group members exceeds a group count threshold value for the common item, the group count threshold value predefined by a client device of a user providing the common item;
in response to receiving the search query and determining that the count of group members exceeds the group count threshold value, concurrently presenting the first search result element and the second search result element in the graphical user interface,
the first search result element identifying the group, the common item, and the common range,
the second search result element identifying a listing of the common item provided by another user.

31. The apparatus of claim 1, wherein the group offer is provided based on a size of the group.

* * * * *

UNITED STATES PATENT AND TRADEMARK OFFICE
CERTIFICATE OF CORRECTION

PATENT NO. : 10,319,009 B2
APPLICATION NO. : 13/935109
DATED : June 11, 2019
INVENTOR(S) : Bhupendra Jain Page 1 of 1

It is certified that error appears in the above-identified patent and that said Letters Patent is hereby corrected as shown below:

In the Claims

In Column 15, Line 49, in Claim 2, delete "more of" and insert -- more of: --, therefor.

In Column 16, Line 10, in Claim 7, delete "more of" and insert -- more of: --, therefor.

In Column 16, Line 35, in Claim 11, delete "over" and insert -- offer --, therefor.

In Column 16, Line 39, in Claim 12, delete "that;" and insert -- that, --, therefor.

In Column 16, Line 44, in Claim 12, delete "over." and insert -- offer. --, therefor.

In Column 16, Line 62, in Claim 16, delete "item; inventory" and insert -- item; 3) an inventory --, therefor.

Signed and Sealed this
Twenty-first Day of July, 2020

Andrei Iancu
*Director of the United States Patent and Trademark Office*